US 11,644,064 B2

(12) United States Patent
Werner et al.

(10) Patent No.: US 11,644,064 B2
(45) Date of Patent: May 9, 2023

(54) BEARING BUSH

(71) Applicant: VIBRACOUSTIC GMBH, Darmstadt (DE)

(72) Inventors: Philipp Werner, Lüneburg (DE); Hilrich Kardoes, Winsen (DE); Bartolomeo Firszt, Gödenstorf (DE); Oliver Helmke, Apensen (DE)

(73) Assignee: Vibracoustic SE, Darmstadt (DE)

( * ) Notice: Subject to any disclaimer, the term of this patent is extended or adjusted under 35 U.S.C. 154(b) by 580 days.

(21) Appl. No.: 16/624,080

(22) PCT Filed: May 30, 2018

(86) PCT No.: PCT/EP2018/064260
§ 371 (c)(1),
(2) Date: Dec. 18, 2019

(87) PCT Pub. No.: WO2018/234002
PCT Pub. Date: Dec. 27, 2018

(65) Prior Publication Data
US 2021/0148407 A1 May 20, 2021

Related U.S. Application Data

(63) Continuation-in-part of application No. 16/487,980, filed as application No. PCT/EP2018/054437 on Feb. 22, 2018, now Pat. No. 11,015,653.

(30) Foreign Application Priority Data

Feb. 24, 2017 (DE) .................... 10 2017 103 940.6
Jun. 19, 2017 (DE) .................... 10 2017 113 437.9

(51) Int. Cl.
F16F 1/38 (2006.01)
F16C 33/20 (2006.01)
(Continued)

(52) U.S. Cl.
CPC ............ *F16C 33/201* (2013.01); *F16C 17/02* (2013.01); *F16C 33/046* (2013.01);
(Continued)

(58) Field of Classification Search
CPC ...... F16C 33/201; F16C 17/02; F16C 33/046; F16F 1/3814; F16F 1/3821; F16F 1/3856;
(Continued)

(56) References Cited

U.S. PATENT DOCUMENTS 1,811,887 A * 6/1931 Jansson .................. H01B 17/26
218/112
2,562,381 A * 7/1951 Goldsmith ............ F16F 1/3863
403/226
(Continued)

FOREIGN PATENT DOCUMENTS

CN 1312891 A 9/2001
CN 101403416 A 4/2009
(Continued)

OTHER PUBLICATIONS

International Search Report PCT/EP2018/054437, dated Jun. 25, 2018.
(Continued)

Primary Examiner — Thomas J Williams
Assistant Examiner — James K Hsiao
(74) Attorney, Agent, or Firm — Fishman Stewart PLLC

(57) ABSTRACT

A bearing bush for supporting a motor vehicle part includes an inner tube made of a metal, a sliding sleeve made of a first plastic material and mounted rotatably on the inner tube, and an elastomer bearing which surrounds the sliding sleeve and has at least a first elastomer body and an outer sleeve. A sliding layer made of a second plastic material is applied to an outer circumferential surface of the inner tube, the first plastic material and the second plastic material forming a
(Continued)

tribological pairing either of two different polymers from the groups of polyamides, polyoxymethylenes, polyketones, fluoropolymers, polyethylene terephthalates or polybutylene terephthalates, or the tribological pairing being formed from polyketone against polyketone, wherein the polymers of the tribological pairings each are present in a continuous thermoplastic polymer phase.

17 Claims, 5 Drawing Sheets

(51) Int. Cl.
  *F16C 17/02* (2006.01)
  *B60G 11/12* (2006.01)
  *F16C 33/04* (2006.01)
  *B60G 11/00* (2006.01)
(52) U.S. Cl.
  CPC .......... *F16F 1/3814* (2013.01); *F16F 1/3821* (2013.01); *F16F 1/3856* (2013.01); *B60G 11/003* (2013.01); *B60G 11/12* (2013.01); *B60G 2204/121* (2013.01); *B60G 2204/41* (2013.01); *B60G 2204/418* (2013.01); *B60G 2206/71043* (2013.01); *B60G 2206/72* (2013.01); *B60G 2206/73* (2013.01); *B60G 2206/821* (2013.01); *B60G 2206/82092* (2013.01); *F16F 2224/02* (2013.01); *F16F 2224/025* (2013.01); *F16F 2224/0208* (2013.01); *F16F 2226/042* (2013.01); *F16F 2226/045* (2013.01); *F16F 2230/007* (2013.01); *F16F 2230/04* (2013.01); *F16F 2230/30* (2013.01); *F16F 2234/02* (2013.01)
(58) Field of Classification Search
  CPC ........... F16F 2224/02; F16F 2224/0208; F16F 2224/025; F16F 2226/042; F16F 2226/045; F16F 2230/007; F16F 2230/04; F16F 2230/30; F16F 2234/02; B60G 1/3856; B60G 11/003; B60G 11/12; B60G 2204/121; B60G 2204/41; B60G 2204/418; B60G 2206/71043; B60G 2206/72; B60G 2206/73; B60G 2208/82092; B60G 2206/821
  See application file for complete search history.

(56) References Cited

U.S. PATENT DOCUMENTS

| | | | | |
|---|---|---|---|---|
| 3,575,787 | A * | 4/1971 | Pietrocini et al. | F16C 33/208 |
| | | | | 428/458 |
| 3,920,293 | A * | 11/1975 | Takeuchi | F16C 33/20 |
| | | | | 384/129 |
| 4,767,108 | A * | 8/1988 | Tanaka | B60G 7/00 |
| | | | | 267/293 |
| 5,171,622 | A | 12/1992 | Wegner | |
| 5,540,420 | A | 7/1996 | Luzsicza | |
| 5,593,233 | A | 1/1997 | Kammel et al. | |
| 6,461,679 | B1 | 10/2002 | McMeekin et al. | |
| 6,702,467 | B2 | 3/2004 | Testroet | |
| 7,267,485 | B2 | 9/2007 | Wagener et al. | |
| 8,328,427 | B2 | 12/2012 | Kellam | |
| 8,579,510 | B2 * | 11/2013 | Noble | F16F 1/3842 |
| | | | | 384/129 |
| 8,967,869 | B2 * | 3/2015 | Schneider | F16C 33/208 |
| | | | | 384/129 |
| 8,998,497 | B2 | 4/2015 | Kaneko | |
| 10,113,588 | B2 * | 10/2018 | Schmitjes | F16C 33/04 |
| 11,235,944 | B1 * | 2/2022 | Jordan | B65H 75/08 |
| 2006/0215944 | A1 * | 9/2006 | Watai | F16C 17/10 |
| | | | | 384/420 |
| 2008/0159671 | A1 * | 7/2008 | Leonardelli | B05D 5/08 |
| | | | | 508/108 |
| 2009/0257858 | A1 * | 10/2009 | Weclawski | B65G 47/918 |
| | | | | 414/749.1 |
| 2009/0311476 | A1 * | 12/2009 | Stetina | B05D 5/08 |
| | | | | 508/108 |
| 2010/0040317 | A1 * | 2/2010 | Kellam | B60G 15/068 |
| | | | | 384/482 |
| 2011/0049834 | A1 | 3/2011 | Natu | |
| 2011/0222803 | A1 * | 9/2011 | Noble | F16F 1/3842 |
| | | | | 29/898.054 |
| 2011/0287272 | A1 | 11/2011 | Elia | |
| 2012/0251020 | A1 | 10/2012 | Swei | |
| 2014/0216871 | A1 * | 8/2014 | Shibahara | F16F 9/187 |
| | | | | 188/313 |
| 2014/0254965 | A1 * | 9/2014 | Giegel | F16C 35/02 |
| | | | | 384/129 |
| 2015/0093066 | A1 * | 4/2015 | Speicher | B32B 7/12 |
| | | | | 428/221 |
| 2015/0125101 | A1 * | 5/2015 | Kachoosangi | F16C 33/125 |
| | | | | 508/108 |
| 2016/0069112 | A1 * | 3/2016 | Neumark | F16C 33/205 |
| | | | | 16/273 |
| 2016/0084308 | A1 * | 3/2016 | Gorges | F16C 33/201 |
| | | | | 508/105 |
| 2016/0097015 | A1 * | 4/2016 | Latham | F16C 33/206 |
| | | | | 508/107 |
| 2016/0273582 | A1 | 9/2016 | Fisher | |
| 2016/0341251 | A1 * | 11/2016 | Yoshizuka | B29C 45/1459 |
| 2017/0029661 | A1 * | 2/2017 | Allen | C08G 18/6216 |
| 2017/0051804 | A1 * | 2/2017 | Zimmerman | F16C 11/04 |
| 2017/0081522 | A1 * | 3/2017 | Adam | C09D 7/61 |
| 2017/0088787 | A1 * | 3/2017 | Zia | C08L 59/02 |
| 2017/0175812 | A1 * | 6/2017 | Masse | F16C 33/208 |
| 2017/0219008 | A1 * | 8/2017 | Tsuboi | F16C 33/14 |
| 2017/0306140 | A1 * | 10/2017 | Shimoda | C08K 5/13 |
| 2018/0037732 | A1 * | 2/2018 | Shimoda | C08L 51/06 |
| 2018/0135716 | A1 * | 5/2018 | Zimmerman | F16C 11/04 |

FOREIGN PATENT DOCUMENTS

| | | |
|---|---|---|
| CN | 102264810 A | 11/2011 |
| DE | 2308947 A1 | 11/1973 |
| DE | 2545922 A1 | 4/1977 |
| DE | 7701761 U1 | 6/1977 |
| DE | 2935205 A1 | 4/1981 |
| DE | 3939704 A1 | 6/1991 |
| DE | 19545425 A1 | 6/1997 |
| DE | 19581613 C2 | 10/2002 |
| DE | 102004031302 A1 | 1/2006 |
| DE | 102008057590 A1 | 2/2010 |
| DE | 102009056351 A1 | 6/2011 |
| DE | 102012205606 A1 | 10/2012 |
| DE | 102014102125 A1 | 8/2015 |
| DE | 102015217416 A1 | 10/2016 |
| EP | 0697298 B1 | 10/1997 |
| EP | 1013961 A2 | 6/2000 |
| EP | 1245415 B1 | 1/2007 |
| EP | 2532905 A1 | 12/2012 |
| EP | 2574481 A2 | 4/2013 |
| GB | 2284865 A | 6/1995 |
| JP | H06346083 A | 12/1994 |
| JP | 2012097904 A | 5/2012 |
| JP | 2013204810 A | 10/2013 |
| WO | 08/122522 A1 | 10/2008 |
| WO | 2015012350 A1 | 1/2015 |

OTHER PUBLICATIONS

International Search Report PCT/EP2018/064260, dated Jun. 29, 2018.
Wikipedia, Jun. 13, 2017, "Polyamide". Retrieved from https://de.wikipedia.org/w/index.php?title=Polyamide&oldid=166348320.

(56) References Cited

OTHER PUBLICATIONS

International Search Report, CN 20188002143, dated Dec. 18, 2020.

* cited by examiner

BEARING BUSH

CROSS-REFERENCE TO RELATED APPLICATIONS

This application is a National Stage Patent Application of International Patent Application No. PCT/EP2018/064260, filed May 30, 2018, which claims the benefit of German Application Serial No. 10 2017 113 437.9, filed Jun. 19, 2017, and this application is a Continuation-in-Part of U.S. application Ser. No. 16/487,980, filed Aug. 22, 2019, which is a National Stage Patent Application of International Patent Application PCT/EP2018/054437, filed Feb. 22, 2018, which claims the benefit of German Application Serial No. 10 2017 103 940.6, filed Feb. 24, 2017, the contents of each are incorporated by reference in their entireties.

TECHNICAL FIELD

The present invention relates to a bearing bush, in particular a sliding bearing bush, for supporting a motor vehicle part, comprising an inner tube made of a metal, a sliding sleeve made of a first plastic material which is mounted rotatably on the inner tube, and an elastomer bearing which surrounds the sliding sleeve and comprises at least a first elastomer body and an outer sleeve.

BACKGROUND

A bearing bush of the type mentioned above serves to support a motor vehicle part, in particular a chassis part, in order to dampen and/or absorb vibrations that occur. If the bearing bush is used in the vehicle where high torsion angles can occur, such as in the chassis as a leaf spring eye bearing for a leaf spring or as a driver's cabin bearing in the commercial vehicle sector, then it is necessary for the outer sleeve to be able to rotate relative to the inner tube in order to avoid damage to the elastomer body. Such bearing bushes are also referred to as sliding bearing bushes. In EP 0 697 298 B1, a sliding bearing bush is disclosed, which has an inner tube and a sliding sleeve arranged rotatably on the inner tube and an outer sleeve arranged on the sliding sleeve. An elastomer body is vulcanised onto the outer circumference of the outer bush, the elastomer body being surrounded by a support ring.

Furthermore, EP 1 245 415 B1 discloses a slide bearing bush which has an inner tube, a sliding sleeve arranged concentrically on it and in a rotatably sliding manner, and an elastomer body vulcanised onto the sliding sleeve. In order to enhance the friction properties, the sliding sleeve is provided with a sliding layer on its inner circumferential surface, the sliding layer consisting of a polytetrafluoroethylene compound material.

In addition, EP 1 013 961 A2 discloses a sliding bearing bush comprising a steel inner tube, a sliding sleeve rotatably disposed on the inner tube, a pressure distribution tube slid onto the sliding sleeve, an elastomer body vulcanised to the pressure distribution tube and an outer sleeve vulcanised to the elastomer body. The sliding bearing tube may be a plastic tube having a radially inner sliding layer or a steel tube having a radially inner porous tin bronze layer and a plastic sliding layer embedded therein. Polytetrafluoroethylene or polyoxymethylene are used as plastic sliding layers.

DE 10 2004 031 302 A1 reveals a sliding bearing bush that has a steel inner sleeve, a plastic sliding layer surrounding the inner sleeve, an aluminium outer sleeve surrounding the sliding layer, an elastomer body vulcanised to the outer sleeve and a receiving sleeve vulcanised to the elastomer body.

In addition, GB 2284865 reveals a sliding bearing bush that has a metal inner tube, a plastic sliding sleeve and an elastomer body vulcanised to the sliding sleeve. On an outer circumferential surface of the inner tube, a sliding layer of epoxy resin or a varnish system provided with friction-reducing or wear-reducing additives such as polytetrafluoroethylene particles or molybdenum disulphide may be applied.

SUMMARY

The present invention is based on the task of creating a bearing bush, in particular a sliding bearing bush, which has improved tribological and wear properties and is also inexpensive to manufacture.

To solve the task, a bearing bush is proposed.

Advantageous designs of the bearing bush are disclosed.

A bearing bush for mounting a motor vehicle part has an inner tube made of a metal, a sliding sleeve of a first plastic material and rotatably mounted on the inner tube, and an elastomer bearing surrounding the sliding sleeve and having at least a first elastomer body and an outer sleeve, wherein a sliding layer of a second plastic material is applied to an outer circumferential surface of the inner tube, wherein either the first plastic material and the second plastic material form a tribological pairing of two different polymers from the groups of polyamides, polyoxymethylenes, polyketones, fluoropolymers, polyethylene terephthalates or polybutylene terephthalates, or the tribological pairing is formed from polyketone against polyketone, wherein the polymers of the tribological pairings are each present in a continuous, thermoplastic polymer phase.

The invention is based on the realisation that very good tribological properties can be achieved by using a tribological pairing of two different polymers from the groups of polyamides (PA), polyoxymethylenes (POM), polyketones (PK), fluoropolymers, polyethylene terephthalates (PET) or polybutylene terephthalates (PBT) or a tribological pairing of polyketone against polyketone if both layers form a continuous thermoplastic polymer phase. The sliding layer and the sliding sleeve consist of different plastic classes of the classes polyamide (PA), polyoxymethylene (POM), polyketone (PK), fluoropolymers, e.g. polytetrafluoroethylene (PTFE), polyethylene terephthalate (PET) or polybutylene terephthalate (PBT). Alternatively, both of the sliding layer and the sliding sleeve may consist of polyketone. The sliding layer on the inner tube, which is designed as a continuous polymer layer, creates a hybrid inner tube, or a hybrid core, with improved tribological and wear properties. As the sliding layer of thermoplastic polymers from the PA, POM, PK, PET, PBT and PTFE groups forms a continuous phase, the hybrid inner tube may be used directly as a second tribological partner without an additional sliding sleeve having to be integrated into the component. This makes the bearing bush inexpensive to manufacture. The friction pairing, consisting of continuous phases of two thermoplastic polymers from the PA, POM, PK, PET, PBT and PTFE groups, also exhibits low adhesive forces and thus a low coefficient of friction and thus improved tribological properties. Furthermore, if the polyamide sliding sleeve has a melting point higher than 200° C., the elastomer body of the elastomer bearing can be vulcanized directly to the sliding sleeve, since the melting point of some polyamides, such as PA6 or PA66, is higher than the melting point of polyoxymethylene. In addition, since the sliding layer forms a closed polymer layer on the inner tube, the sliding layer serves as corrosion protection for the inner tube. The sliding layer may be applied to the inner tube by powder coating, in particular by electrostatic powder coating. For this purpose, the sliding layer is available as powder, which is applied to the inner tube by powder coating, in particular by electrostatic powder coating. The plastic sliding sleeve may be manufactured by injection moulding, in the case of PTFE by pressing and sintering, for instance.

It has also been recognised that the use of a sliding layer of PA, POM, PK, PET, PBT and PTFE does not require precision finishing of the metal inner tube. Instead, the sliding layer of PA, POM, PK, PET, PBT and PTFE is applied to a surface of the metal that is suitable for adhesion and can be produced cost-effectively, for example a blasted surface or a conversion layer. During the remelting process that follows the electrostatic powder coating process, for example in a continuous furnace, during which the powder is introduced into the closed surface layer, the polymer cools down very slowly and can therefore also form high degrees of crystallinity on the surface. The result is a highly crystalline, rough surface that minimizes wear and virtually eliminates annoying running-in effects.

Since the roughness is caused by the crystallization process, it tends to increase with increasing degree of crystallinity. The co-polymer of polyoxymethylene has a particularly high degree of crystallinity with approx. 75% and thus has a particularly distinct roughness. In lubricated systems, this roughness leads to a particularly good tribological behaviour, since the depressions of the rough surface serve as lubricant depots on a microscopic scale. The combination of a sliding layer of polyoxymethylene with a sliding body of polyamide or polyketone, using a lubricant, is therefore a particularly preferred tribological pairing.

In addition, semi-crystalline polymers such as polyoxymethylene, polyamide, polyethylene terephthalate, polybutylene terephthalate, polytetrafluoroethylene or polyketone, which are applied to the substrate as a sliding layer by means of electrostatic powder coating, have a very high degree of crystallinity close to the theoretically maximum achievable value after the remelting process, in particular also on the surface. The injection skin observed in injection moulding, which is often characterized by a high amorphous content, but also by demixing of possible additives, is not observed by powder coating. This results in excellent wear resistance and almost completely avoids running-in effects.

In an advantageous design, polyoxymethylene is a polyoxymethylene copolymer (POM-C) or a polyoxymethylene homopolymer (POM-H). Preferably, POM-C or POM-H is used as sliding layer. POM-C has a degree of crystallinity of approx. 75% and exhibits particularly high toughness and abrasion resistance. If polyoxymethylene is used as a sliding sleeve, POM-H is an advantageous choice because the theoretical crystallinity of POM-H is even higher at approx. 90%, thus creating a sliding sleeve of particularly high hardness and strength. As a result, the bearing bush has a long service life. A polybutylene terephthalate can also be used as an alternative to POM, especially if its higher melting point is required. For example, an elastomer could be vulcanized directly onto a PBT sliding sleeve.

In an advantageous design, the polyamide is an aliphatic polyamide or a partially aromatic polyamide. A sliding friction partner used from the group of polyamides is inexpensive, wear-resistant in particular against polyoxymethylene as a friction partner, and has good tribological properties in this combination. Aliphatic polyamides can be polyamide 6 (PA6), polyamide 12 (PA12), polyamide 46 (PA46), polyamide 66 (PA66) or polyamide 666 (PA666). If the sliding bushing is made of polyamide and the elastomer track is vulcanized onto the outside circumference of the sliding bushing, the use of PA6 or PA66 is preferred. Polyamide 6 (PA6), polyamide 46 (PA46), polyamide 66 (PA66) or polyamide 666 (PA666) have a high melting point, thus enabling direct adhesion to a natural rubber compound to be achieved at normal vulcanisation temperatures. These materials are therefore suitable for use as sliding sleeves with directly vulcanised elastomer or rubber. Adhesives available on the market or used in the elastomer industry can provide good adhesion to these materials. If no elastomer track is vulcanised onto the sliding sleeve, but the sleeve is connected to the sliding sleeve in a form-fit and/or force-fit manner, the use of PA12, which has excellent tribological properties in combination with polyoxymethylene, is preferred.

In an advantageous design, the sliding layer and/or sliding sleeve has at least one additive. This improves the tribological properties of the sliding bearing bush. In an advantageous design, the polyamide, polyoxymethylene, polyethylene terephthalate, polybutylene terephthalate and/or polyketone have at least one additive. This further improves the tribological properties of the tribological pairing. In addition, additives improve the mechanical and/or thermal properties of the plastic. Advantageously, the at least one additive is incorporated into the polymer sliding layer forming the continuous layer in such a way that the additive is also disposed in the surface of the continuous sliding layer and can thus immediately become tribologically active there. This can be achieved by the fact that the plastic powder for the sliding coating is a compound of polyamide, polyoxymethylene, polyethylene terephthalate, polybutylene terephthalate or polyketone and the additive or additives.

In an advantageous design, the additive has polytetrafluoroethylene (PTFE), graphite, carbon nanofibres, carbon fibres, aramid fibres, minerals, molybdenum disulphide, talcum, oils, waxes, glass balls and/or glass fibres. These additives are mixed with the main polymer component by means of compounding, homogenized, ground and then made available as powder in a process step that precedes powder coating. If this powder is applied to the core in an electrostatic powder coating process, a very homogeneous distribution of the additives up to the surface layer can be achieved in combination with a high degree of crystallinity of the surface layer. This almost completely eliminates the risk of demixing, as it occurs in varnishing processes or powder coating processes based on duromers, for instance. There is also a tendency towards an amorphous surface layer typical of injection moulding processes. As a result, the tribological pairing has uniform tribological properties throughout the entire service life.

In an advantageous design, the plastic has a degree of crystallinity of at least 80% of its maximum theoretical value on the surface of the sliding layer.

The sliding layer may be applied using a powder coating process. The sliding layer is preferably applied by means of an electrostatic powder coating process. This allows a homogeneous, continuous sliding layer of polyoxymethylene, polyamide, polyethylene terephthalate, polybutylene terephthalate, polytetrafluoroethylene or polyketone to be applied to the inner tube at low cost. If a sliding layer of polyoxymethylene, polyamide, polyethylene terephthalate, polybutylene terephthalate, polytetrafluorethylene or polyketone is applied by means of an electrostatic powder coating process, a statistical distribution of the additives can be achieved in such a way that the additives can already be found in the new state immediately after the coating on the surface of the polyoxymethylene, polyamide, polyethylene terephthalate, polybutylene terephthalate, polytetrafluoroethylene or polyketone layer. There, they are immediately mobile and can immediately have a tribologically active effect with almost no running-in effects. Furthermore, the electrostatic powder coating process, in which the powder mixture is heated, for example, in a circulating furnace and remelted on the substrate, leads to a polyoxymethylene, polyamide, polylyethylene terephthalate, polybutylene terephthalate, polytetrafluoroethylene or polylyketone layer during the final slow cooling process, having a degree of crystallinity close to the theoretical maximum over the entire cross-section that is virtually homogeneous. Furthermore, a nearly closed polymer layer can be applied to the inner tube by powder coating, which serves as a very good corrosion protection for the inner tube. The resulting roughness is due to the crystallite formation on the surface and is responsible for the excellent tribological properties.

In an advantageous design, the sliding layer has a thickness between approx. 50 μm and approx. 300 μm, in particular between approx. 70 μm and approx. 150 μm. As a result, the sliding layer has a high mechanical resistance and serves as corrosion protection for the inner tube.

In an advantageous design, an adhesive layer is applied to the outer circumferential surface of the inner pipe. The adhesive layer ensures improved adhesion of the thermoplastic sliding layer to the inner pipe. The adhesive layer is thus located between the outer circumferential surface of the inner pipe and the sliding layer. The adhesive layer is preferably made of an epoxy resin. The adhesive layer can be applied to the outer circumferential surface of the inner tube by means of varnishing and/or powder coating, in particular electrostatic powder coating. For example, the adhesive layer is first applied to a metal surface that is suitable for adhesion and can be produced cost-effectively, for example a blasted surface or a conversion layer. The sliding layer of polyoxymethylene, polyamide, polyethylene terephthalate, polybutylene terephthalate, polytetrafluoroethylene or polyketone is then applied to the adhesive layer, for example on the basis of an epoxy resin. Furthermore, the adhesive layer together with the sliding layer serves as corrosion protection for the inner pipe. Advantageously, the adhesive layer is an adhesion promoter. The adhesive layer has an advantageous layer thickness of 10 to 100 μm, preferably between 20 and 40 μm. In addition, a second adhesive layer may be applied to the sliding sleeve to which the first elastomer body is vulcanized. The second adhesive layer may be applied by varnishing, spraying, dipping, dip-spin or rolling. The second adhesive layer serves as adhesion promoter for the first elastomer body on the sliding sleeve. The adhesive layer may also be referred to as a primer layer or cover layer.

In an advantageous embodiment, the sliding sleeve has at least one recess for receiving a lubricant on a surface facing the sliding layer. The recess serves as a depot for a lubricant. Preferably, the recess extends in the longitudinal direction of the bearing bush. Further preferably, the recess is also designed as a lubricant groove. Advantageously, the recess is inserted into an inner circumferential surface of the sliding sleeve. In addition, several recesses can be provided in the surface of the sliding sleeve facing the sliding layer. The lubricant reduces the friction between the two sliding bodies and improves breakaway and tribological properties. Since the plastic has a degree of crystallinity on the surface of the sliding layer of at least 80% of its maximum theoretical value, the sliding layer has a rough, uneven surface. As a result, the lubricant may be deposited in the uneven surface so that the depressions in the uneven surface serve as a lubricant depot.

In an advantageous embodiment, the lubricant is a grease that has a consistency index of between approx. 1 and approx. 4, in particular between approx. 2 and approx. 3. Here, the consistency index refers to the NLGI class according to DIN 51818.

In an advantageous embodiment, the sliding sleeve is slotted or designed in several parts. This allows the sliding sleeve to exert a preload on the sliding layer when mounting the bearing bush in a bearing receiving eye in order to achieve clearance-free contact of the tribological pairing. Advantageously, the sliding sleeve has a continuous slot.

In an advantageous design, the elastomer bearing is connected to the sliding sleeve in a form-locking, force-locking and/or material-locking manner. Preferably, the first elastomer body of the elastomer bearing is connected to the sliding sleeve. If the sliding sleeve is made of PA6 or PA66, the first elastomer body is preferably bonded to the sliding sleeve by vulcanizing the first elastomer body to the sliding sleeve using a single-component or multi-component adhesion promoter. If the sliding sleeve is made of polyoxymethylene or PA12, the first elastomer body is preferably connected to the sliding sleeve in a form-locking and/or force-locking manner. In this way, the elastomer body can be pushed, in particular pressed, onto the sliding sleeve.

In an advantageous embodiment, the elastomer bearing is slotted or designed in several parts. This allows a preload to be exerted on the tribological pairing when mounting the bearing bush in a bearing receiving eye in order to achieve clearance-free contact between the tribological partners. Advantageously, the elastomer bearing has a continuous slot.

In an advantageous design, the elastomer bearing has an inner sleeve that encloses the sliding sleeve. The inner sleeve is connected to the sliding sleeve in a form-locking and/or force-locking manner. In particular, the inner sleeve is pushed, in particular pressed, onto the sliding sleeve, wherein the first elastomer body is vulcanised onto the inner sleeve, in particular an outer surface of the inner sleeve.

The elastomer bearing may have a second elastomer body connected to an inner circumferential surface of the inner sleeve. A preload can be applied to the sliding sleeve by means of the second elastomer body in order to achieve a clearance-free contact of the tribological pairing. The second elastomer body may be a continuous elastomer track or may be formed from a plurality of elastomer elements spaced apart from each other, such as projections or ribs. Preferably, the second elastomer track protrudes radially inwards from the inner sleeve.

In an advantageous embodiment, a sealing system is provided which seals a sliding gap. The sealing system prevents environmental influences from penetrating into the sliding gap formed between the two tribological partners. The sealing system may be formed by the elastomer body of the elastomer bearing. Besides, the sealing system may be a separate sealing element connected to the bearing bush. Preferably, the sealing system is designed as at least one sealing lip projecting from the first elastomer body of the elastomer bearing.

Furthermore, a path limiting device may be provided to limit movement of the sliding sleeve in the longitudinal direction of the bearing bush. The abutment device may have two plates, with one plate each being pushed, in particular pressed, onto the end face of the inner tube.

BRIEF DESCRIPTION OF THE DRAWINGS

In the following, the bearing bush as well as other features and advantages are explained in more detail on the exemplary embodiments schematically shown in the figures. Shown here.

DETAILED DESCRIPTION

Figure 1:
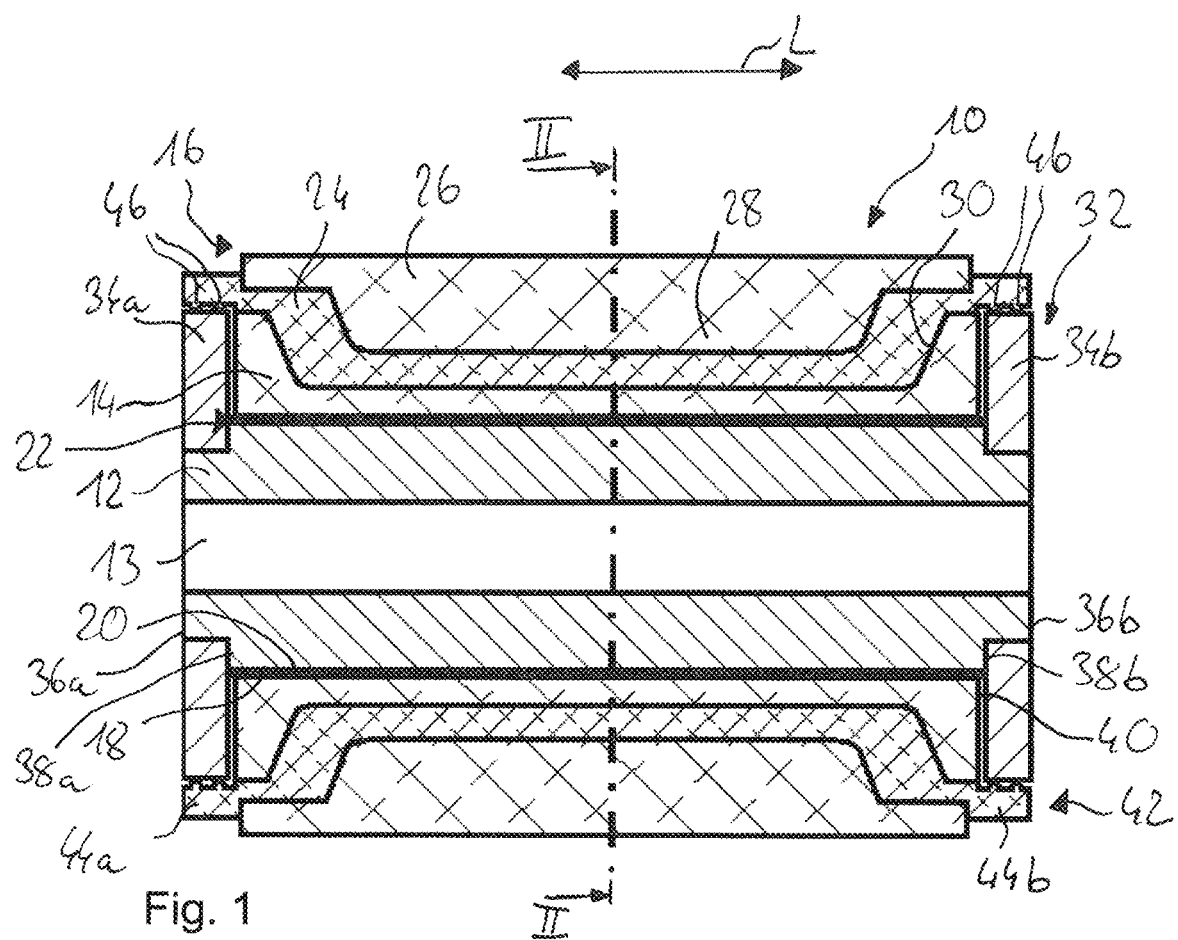
FIG. 1 a longitudinal section through a bearing bush according to a first embodiment.
Figure 2:
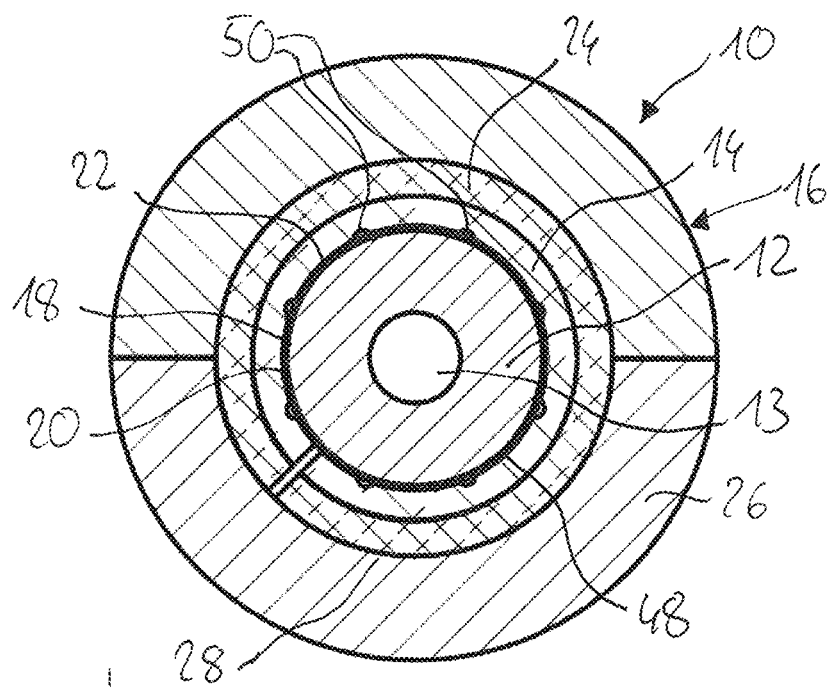
FIG. 2 a cross-section through the bearing bush shown in FIG. 1 along line II-II.

FIGS. 1 and 2 show a bearing bush 10 which is used to support a motor vehicle part (not shown), in particular a chassis component such as a leaf spring. For this purpose, the bearing bush 10 is inserted, in particular pressed, into an unrepresented bearing receiving eye.

The bearing bush 10 has an inner tube 12 made of a metal, a sliding sleeve 14 made of a first plastic, which is rotatably mounted on the inner tube 12, and an elastomer bearing 16.

Preferably, the inner tube 12 is made of steel or aluminium and has a receiving opening 13 for connecting a motor vehicle part (not shown) to the bearing bush 10.

Figure 3:
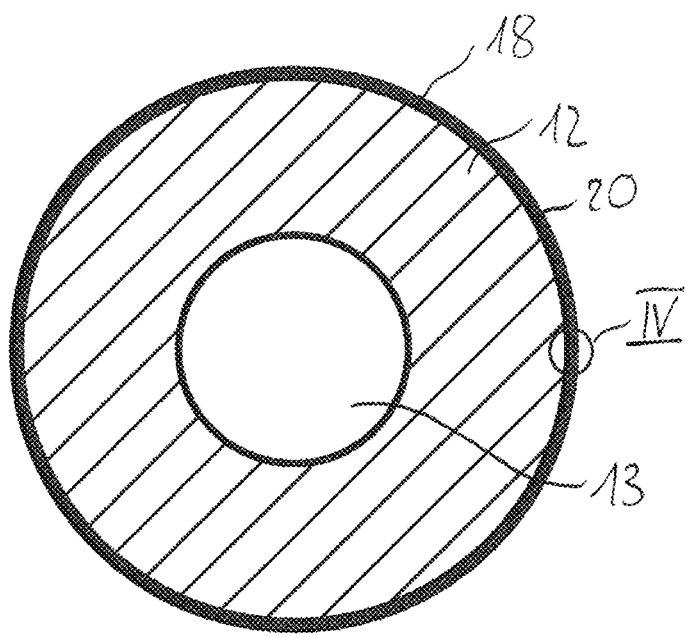
FIG. 3 an enlarged cross-section through an inner tube with a sliding layer applied to it.
Figure 4:
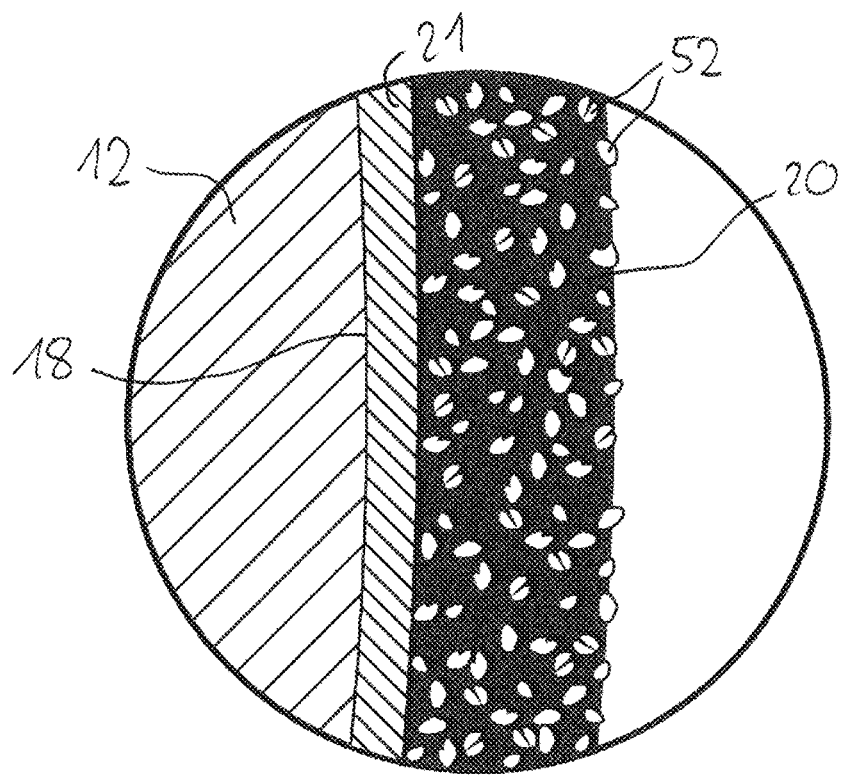
FIG. 4 an enlarged section of detail IV from FIG. 3.

As can be seen especially in FIGS. 3 and 4, an adhesive layer 21 is applied to an outer circumferential surface 18 of the inner tube 12. The adhesive layer 21 is an adhesion promoter made of an epoxy resin and is preferably applied by means of electrostatic powder coating. Advantageously, the adhesive layer 21 has a layer thickness of 10 to 100 µm, preferably between 20 and 40 µm. A sliding layer 20 made of a second plastic is applied to the adhesive layer 21, the sliding sleeve 14 and the sliding layer 20 forming a tribological pairing 22. The sliding layer 20 is preferably applied to the adhesive layer 21 by electrostatic powder coating and has a thickness between approx. 50 µm and approx. 300 µm, in particular between approx. 80 µm and approx. 200 µm. In addition, the sliding layer 20 can also be applied directly to the outer circumferential surface 18 of the inner tube 12.

The sliding layer 20 forms a continuous polymer layer on the inner tube 12, wherein the sliding layer 20 may be from the groups of polyamides (PA), polyoxymethylenes (POM), polyketones (PK), fluoropolymers, polyethylene terephthalates (PET) or polybutylene terephthalates (PBT).

Figure 5:
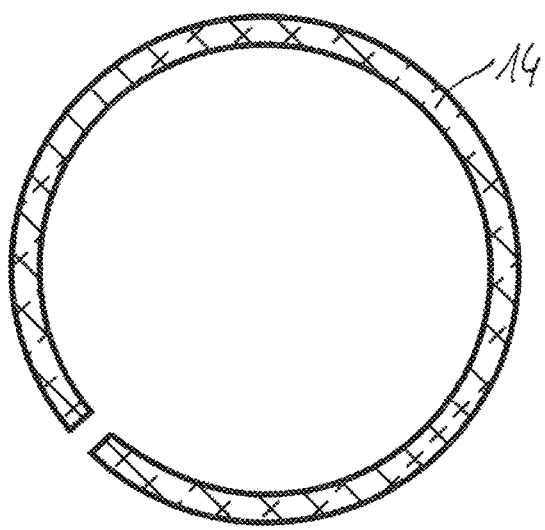
FIG. 5 an enlarged cross-section through a sliding sleeve.

As shown in FIG. 5, the sliding sleeve 14 is slotted. This allows a preload to be applied to the tribological pairing 22 when mounting the bearing bush 10 on a bearing receiving eye in order to achieve a clearance-free contact between the sliding sleeve 14 and the sliding layer 20. The sliding sleeve 14 can be from the groups of polyamides (PA), polyoxymethylenes (POM), polyketones (PK), fluoropolymers, polyethylene terephthalates (PET) or polybutylene terephthalates (PBT).

If the sliding layer 20 is made of polyamide, then the sliding sleeve 14 is made of polylyoxymethylene, polyethylene terephthalate, polybutylene terephthalate or polyketone. If the sliding layer 20 is made of polyoxymethylene, then the sliding sleeve 14 is made of polyamide, polyethylene terephthalate, polybutylene terephthalate or polyketone. If the sliding layer 20 is made of polybutylene terephthalate, then the sliding sleeve 14 is made of polyoxymethylene, polyamide, or polyketone. If the sliding layer 20 is made of polyketone, then the sliding sleeve 14 is made of polyamide, polyethylene terephthalate, polybutylene terephthalate or polyoxymethylene, but may also be made of polyketone.

Polyoxymethylene may be a polyoxymethylene copolymer (POM-C) or a polyoxymethylene homopolymer (POM-H). The polyamide may be an aliphatic polyamide or a partially aromatic polyamide. Aliphatic polyamides may be polyamide 6 (PA6), polyamide 12 (PA12), polyamide 46 (PA46), polyamide 66 (PA66) or polyamide 666 (PA666).

To improve the tribological, mechanical and/or thermal properties of the sliding layer 20, at least one additive 52 may be embedded in the sliding layer 20, as shown in FIG. 4. Additive 52 may be polytetrafluoroethylene (PTFE), graphite, carbon nanofibres, carbon fibres, aramid fibres, minerals, molybdenum disulphide, talcum, oils, waxes, glass beads and/or glass fibres. As can also be seen in FIG. 4, the additive 52 is statistically embedded in the sliding layer 20 in such a way that the additive 52 is also arranged directly at the surface of the sliding layer 20 and can therefore be tribologically effective immediately.

The elastomer bearing 16 has a first elastomer body 24 and an outer sleeve 26 and is connected to the sliding sleeve 14 in a form-fit, force-fit and/or material-fit manner. In the embodiment shown in FIGS. 1 and 2, the elastomer bearing 16 is bonded to the sliding sleeve 14 by the first elastomer body 24 being vulcanised to the sliding sleeve 14. The first elastomer body 24 is also slotted in order to apply a preload to the tribological pairing 22 when mounting the bearing bush 10 on a bearing receiving eye and to thus achieve a clearance-free contact between the sliding sleeve 14 and the sliding layer 20.

As can also be seen in FIG. 2, the outer sleeve 26 is made of two parts, wherein the outer sleeve 26 has a projection 28 which protrudes radially inwards into a corresponding recess 30 of the sliding sleeve 14. The outer sleeve 26 may be made of metal or plastic.

The bearing bush 10 also has a stop device 32 which limits movement of the sliding sleeve 14 relative to the inner tube 12 in the longitudinal direction L of the bearing bush 10. The stop device 32 has a first annular disc 34a and a second annular disc 34b, the first annular disc 34a being connected to a first end face 36a of the inner tube 12 and the second annular disc 34b being connected to a second end face 36b of the inner tube 12. For this purpose the first end face 36a has a first shoulder 38a and the second end face 36b has a second shoulder 38b, wherein the first annular disc 34a is pushed, in particular pressed, onto the first shoulder 38a, and the second annular disc 34b is pushed, in particular pressed, onto the second shoulder 38b.

A sealing system 42 is provided for sealing a sliding gap 40. The sealing system 42 consists of a first projecting axial end area 44a of the first elastomer body 24 and a second axially projecting end area 44b of the first elastomer body 24. Two radially inwardly projecting sealing lips 46 are arranged at each end area 44a, 44b. The sealing lips 46 are in contact with the annular discs 34a, 34b in order to reliably seal the sliding gap 40 against the penetration of environmental influences.

In order to reduce friction within the tribological pairing 22, the sliding sleeve 14 has on an inner surface 48 several recesses 50 extending in axial direction A, which serve as lubricant depots, as shown in FIG. 2.

In the following, further embodiments for the bearing bush 10 and the elastomer bearing 16 are described, wherein the same reference signs are used for identical and functionally identical parts.

Figure 6:
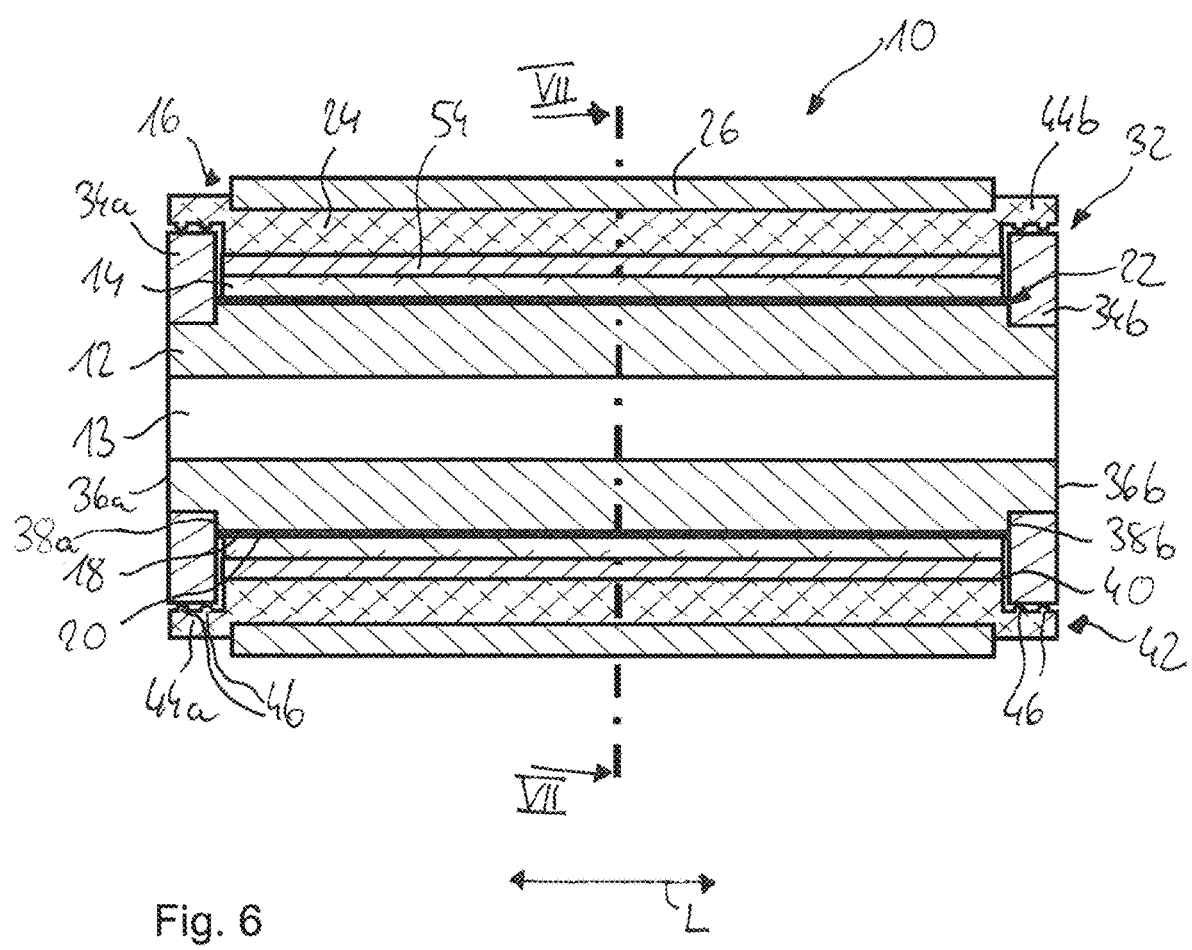
FIG. 6 a longitudinal section through a bearing bush according to a second embodiment.
Figure 7:
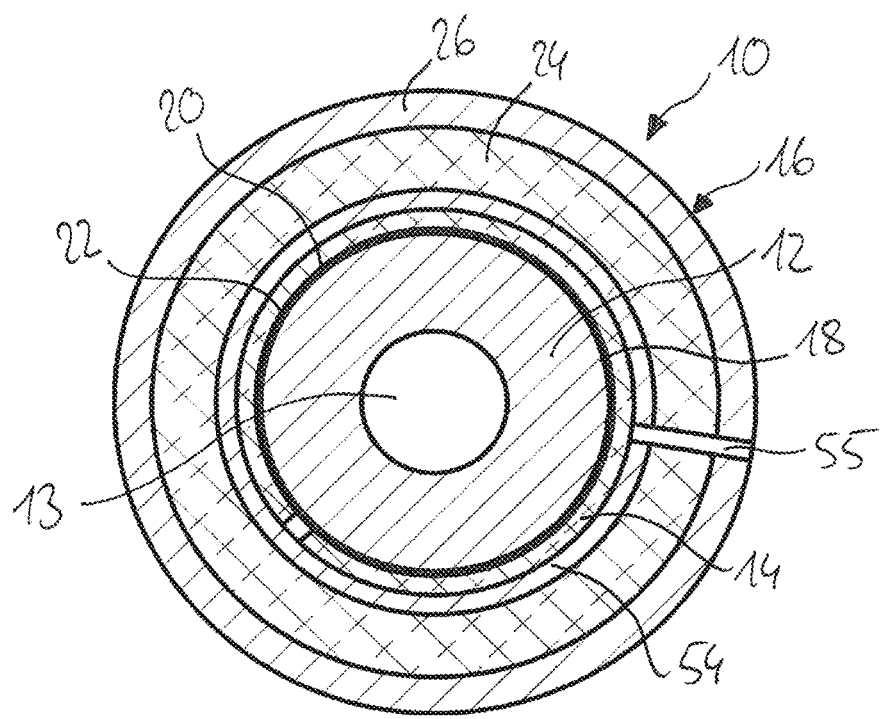
FIG. 7 a cross-section through the bearing bush shown in FIG. 6 along the line VI-VI.

The FIGS. 6 and 7 show a second embodiment of the bearing bush 10, which differs from the first embodiment in that the elastomer bearing 16 has an inner sleeve 54, which is connected to the first elastomer body 24 in a material-locking manner, in particular it is vulcanised onto the first elastomer body 24. The inner sleeve 54 made of metal or plastic is pushed, in particular pressed, onto the sliding sleeve 14. In the second embodiment, the outer sleeve 26 is made in one piece and has no projection 28 which lies in a corresponding recess 30 of the sliding sleeve 14.

According to FIG. 7 the sliding sleeve 14, the inner sleeve 54, the first elastomer body 24 and the outer sleeve 26 are slotted. In particular, the elastomer bearing 16 has a slot 55 extending through the outer sleeve 26, the first elastomer body 24 and the inner sleeve 54. Furthermore, the sliding sleeve 14 in the second embodiment has no recesses 50 serving as lubricant depots.

Figure 8:
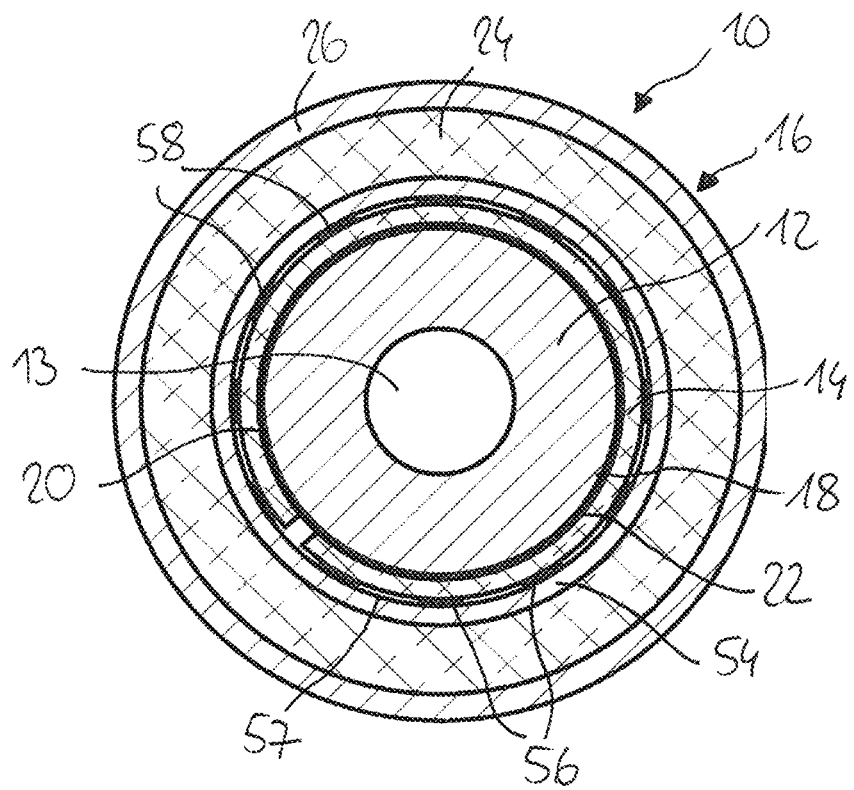
FIG. 8 a cross-section through a bearing bush according to a third embodiment.

FIG. 8 shows a third embodiment of the bearing bush 10 which differs in particular from the second embodiment in that the elastomer bearing 16 has a second elastomer body 56 which is connected to an internal side 57 of the intermediate bush 54.

Figure 9:
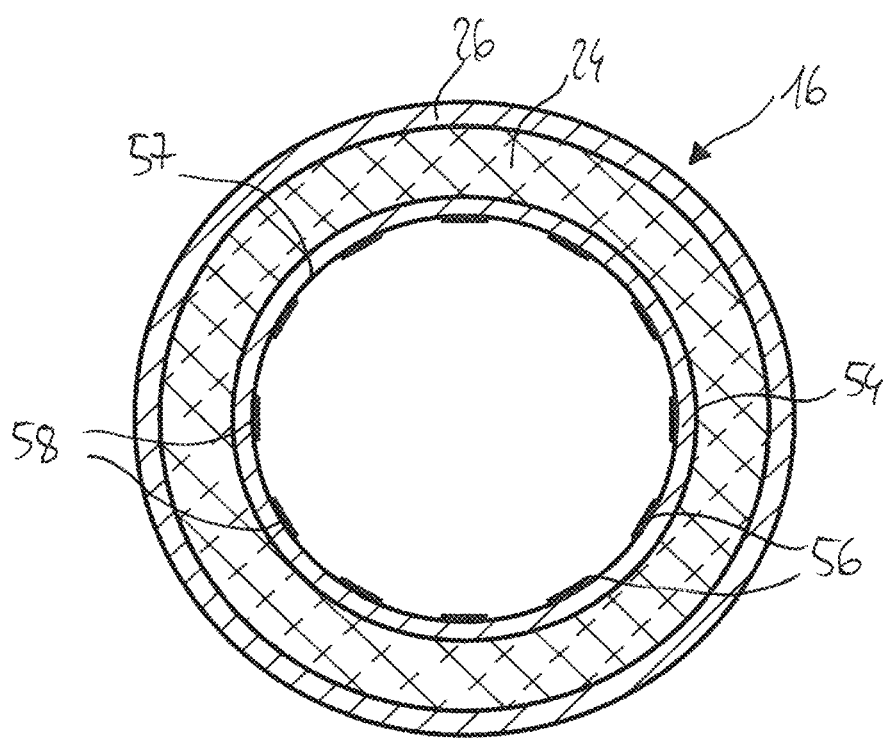
FIG. 9 a cross-section through the elastomer bearing shown in FIG. 8.

As can be seen in FIG. 9 in particular, the second elastomer body 56 is formed from radially inwardly projecting thickenings 58. The second elastomer body 56, together with the slotted sliding sleeve 14, is used to apply a preload to the tribological pairing 22 during the assembly of the bearing bush 10, thus ensuring clearance-free contact between the sliding sleeve 14 and the sliding layer 20.

The invention claimed is:

1. A bearing bush for supporting a motor vehicle part, the bearing bush comprising:
   an inner tube comprised of a metal,
   a sliding sleeve comprised of a first plastic material and mounted rotatably on the inner tube, and
   an elastomer bearing that surrounds the sliding sleeve and has at least a first elastomer body and an outer sleeve,
   wherein a sliding layer comprised of a second plastic material is disposed on an outer circumferential surface of the inner tube, the first plastic material and the second plastic material forming a tribological pairing either of two different polymers from the groups of polyamides, polyoxymethylenes, polyketones, fluoropolymers, polyethylene terephthalates or polybutylene terephthalates, or the tribological pairing being formed from polyketone against polyketone, and wherein the polymers of the tribological pairings each are present in a continuous thermoplastic polymer phase; and the sliding layer is applied to the inner tube by powder coating.

2. The bearing bush according to claim 1, wherein the polyoxymethylene is a polyoxymethylene copolymer or a polyoxymethylene homopolymer.

3. The bearing bush according to claim 1, wherein the polyamide is an aliphatic polyamide or a partially aromatic polyamide.

4. The bearing bush according to claim 1, wherein the sliding sleeve and/or the sliding layer includes at least one additive.

5. The bearing bush according to claim 4, wherein the at least one additive comprises polytetrafluoroethylene, graphite, carbon nanofibres, carbon fibres, aramid fibres, minerals, molybdenum disulphide, talcum, oils, waxes, glass beads and/or glass fibres.

6. The bearing bush according to claim 1, wherein the sliding layer is applied by electrostatic powder coating.

7. The bearing bush according to claim 1, wherein the sliding layer has a thickness between approximately 50 μm and approximately 300 μm.

8. The bearing bush according to claim 1, wherein the sliding layer has a thickness between approximately 70 μm and approximately 150 μm.

9. The bearing bush according to claim 1, wherein an adhesive layer is applied to the outer circumferential surface of the inner tube.

10. The bearing bush according to claim 1, wherein on a surface facing the sliding layer, the sliding sleeve has at least one recess for receiving a lubricant.

11. The bearing bush according to claim 1, wherein the sliding sleeve is slotted or formed in several parts.

12. The bearing bush according to claim 1, wherein the elastomer bearing is slotted or formed in several parts.

13. The bearing bush according to claim 1, wherein the elastomer bearing is connected to the sliding sleeve in a form-locking, force-locking and/or material-locking manner.

14. The bearing bush according to claim 1, wherein the elastomer bearing includes an inner sleeve enclosing the sliding sleeve.

15. The bearing bush according to claim 14, wherein the elastomer bearing has a second elastomer body that is connected to an inner circumferential surface of the inner sleeve.

16. The bearing bush according to claim 1, wherein a sealing system is provided that seals a sliding gap.

17. The bearing bush according to claim 1, wherein a path limiting device is provided that limits movement of the sliding sleeve in a longitudinal direction of the bearing bush.

* * * * *